(12) United States Patent
Bruce et al.

(10) Patent No.: US 7,369,167 B2
(45) Date of Patent: May 6, 2008

(54) PHOTO DIODE ID FOR CMOS IMAGERS

(75) Inventors: Jeff D. Bruce, Meridian, ID (US); Roger Panicacci, Los Angeles, CA (US)

(73) Assignee: Micron Technology, Inc., Boise, ID (US)

( * ) Notice: Subject to any disclaimer, the term of this patent is extended or adjusted under 35 U.S.C. 154(b) by 803 days.

(21) Appl. No.: 10/449,031

(22) Filed: Jun. 2, 2003

(65) Prior Publication Data

US 2004/0239789 A1    Dec. 2, 2004

(51) Int. Cl.
*H04N 3/14* (2006.01)
*H04N 5/335* (2006.01)

(52) U.S. Cl. .................... 348/308; 348/310

(58) Field of Classification Search ............ 348/308, 348/245–247, 222.1, 231.1, 231.9, 263, 310
See application file for complete search history.

(56) References Cited

U.S. PATENT DOCUMENTS

| | | | |
|---|---|---|---|
| 5,883,830 A | 3/1999 | Hirt et al. | |
| 5,953,061 A * | 9/1999 | Biegelsen et al. | 348/308 |
| 6,087,970 A | 7/2000 | Panicacci | |
| 6,330,030 B1 * | 12/2001 | O'Connor | 348/297 |
| 6,396,539 B1 | 5/2002 | Heller et al. | |
| 6,519,371 B1 | 2/2003 | Pain et al. | |
| 6,526,366 B1 | 2/2003 | Dunton | |
| 6,917,380 B1 * | 7/2005 | Tay | 348/247 |
| 7,023,031 B2 * | 4/2006 | Tsai | 257/209 |
| 2004/0160520 A1 * | 8/2004 | Kubota et al. | 348/246 |

FOREIGN PATENT DOCUMENTS

| EP | 1 143 521 A1 | 10/2001 |
|---|---|---|
| JP | 2000-59692 A | 2/2000 |
| JP | 2000059692 | 2/2000 |

OTHER PUBLICATIONS

Taiwanese Search Report with English summary (9 pages), Aug. 7, 2007.

* cited by examiner

*Primary Examiner*—David Ometz
*Assistant Examiner*—Tuan Le
(74) *Attorney, Agent, or Firm*—Dickstein Shapiro LLP

(57) ABSTRACT

A CMOS image pixel array formed on a chip is used for storing programmed information within the pixel array. Manufacturing lot and other data is written to the array during manufacturing and testing by applying a laser to pixels to render the photodiode defective. The programmed data is read from the pixel array using existing circuitry.

26 Claims, 6 Drawing Sheets

PHOTO DIODE ID FOR CMOS IMAGERS

FIELD OF THE INVENTION

The invention relates generally to semiconductor imaging devices, and more particularly to a CMOS pixel sensor imager having an array of pixel cells, in which a portion of the pixel array is programmed to store data.

BACKGROUND OF THE INVENTION

There is a current interest in CMOS active pixel imagers for use as low cost imaging devices. An exemplary pixel circuit of a CMOS active pixel sensor (APS) is described below with reference to FIG. 1, where the circuit is identified generally by reference number 100. Active pixel sensors can have one or more active transistors within the pixel unit cell, can be made compatible with CMOS technologies, and promise higher readout rates compared to passive pixel sensors. The pixel cell shown in FIG. 1 is a 3T APS pixel cell, identified by reference number 150, where the 3T is commonly used in the art to designate the use of three transistors to operate the pixel. A 3T APS includes has a photodiode 162, a reset transistor 184, a source follower transistor 186, and a row select transistor 188. It should be understood that while FIG. 1 shows the circuitry for operation of a single pixel, in practice the imager will be formed of an M times N array of identical pixels arranged in rows and columns, with the pixels of the array accessed using row and column select circuitry, as described in more detail below.

The photodiode 162 converts incident photons to electrons which collect at node A. A source follower transistor 186 has its gate connected to node A and thus amplifies the signal appearing at Node A. When a particular row containing cell 150 is selected by a row selection transistor 188, the signal amplified by transistor 186 is passed on a column line 170 to the readout circuitry. The photodiode 162 accumulates a photo-generated charge in a doped region of the substrate. It should be understood that the CMOS imager might include a photogate or other photo conversion device, in lieu of a photodiode, for producing photo-generated charge.

A reset voltage source Vrst is selectively coupled through reset transistor 184 to node A. The gate of reset transistor 184 is coupled to a reset control line 191 which serves to control the reset operation, i.e., the connection of Vrst to node A. Vrst may be equal to Vdd. The row select control line 160 is coupled to all of the pixels of the same row of the array. Voltage source Vdd is coupled to a source following transistor 186 and its output is selectively coupled to a column line 170 through row select transistor 188. Although not shown in FIG. 1, column line 170 is coupled to all of the pixels of the same column of the array and typically has a current sink at its lower end. The gate of row select transistor 188 is coupled to row select control line 160.

As known in the art, a value is read from pixel 150 in a two step process. During a charge integration period, the photodiode 162 converts photons to electrons which collect at the node A. The charge at node A is amplified by source follower transistor 186 and selectively passed to column line 170 by row access transistor 188. During a reset period, node A is reset by turning on reset transistor 184 to apply the reset voltage Vrst to node A, and this voltage is then read out to column line 170 by the source follower transistor 186 through the activated row select transistor 188. As a result, the two different values—the reset voltage Vrst and the image signal voltage Vsig—are readout from the pixel and sent by the column line 170 to the readout circuitry where each is sampled and held for further processing as known in the art.

All pixels in a row are read out simultaneously onto respective column lines 170 and the column lines are activated in sequence for reset and signal voltage read out. The rows of pixels are also read out in sequence onto the respective column lines.

FIG. 2 shows a CMOS active pixel sensor integrated circuit chip that includes an array of pixels 230 and a controller 232 which provides timing and control signals to control reading out of signals stored in the pixels in a manner commonly known to those skilled in the art. Exemplary arrays have dimensions of M times N pixels, with the size of the array 230 depending on a particular application. The imager is read out a row at a time using a column parallel readout architecture. The controller 232 selects a particular row of pixels in the array 230 by controlling the operation of row addressing circuit 234 and row drivers 240. Charge signals stored in the selected row of pixels are provided on the column lines 170 (FIG. 1) to a readout circuit 242 in the manner described above. The pixel signal read from each of the columns then can be read out sequentially using a column addressing circuit 244. Differential pixel signals (Vrst, Vsig) corresponding to the read out reset signal and integrated charge signal are provided as respective outputs Vout1, Vout2 of the readout circuit 242.

FIG. 3 more clearly shows the rows 321 and columns 349 of pixels 350. Each column includes multiple rows of pixels 350. Signals from the pixels 350 in a particular column can be read out to a readout circuit 351 associated with that column. The read out circuit 351 includes sample and hold circuitry for storing the pixel reset (Vrst) and integrated charge signals (Vsig). Signals stored in the readout circuits 351 then can be read sequentially column-by-column to an output stage 354 which is common to the entire array of pixels 330. The analog output signals can then be sent, for example, to a differential analog circuit and which subtracts the reset and integrated charge signals and sends them to an analog-to-digital converter (ADC), or the reset and integrated charge signals can be supplied directly to the analog-to-digital converter.

FIG. 4 more clearly shows the column readout circuit 351 that includes a sample and hold read out circuit 401 and an amplifier 434. The FIG. 4 circuit is capable of sampling and holding and then amplifying the Vsig and Vrst values for subsequent use by an output stage 354 (FIG. 3).

During manufacture, each imaging pixel array is usually tested individually. Tests detect defective pixel circuits, pixel signal level, and other array attributes, and the information is stored based on lot and individual device identification numbers. The information developed during testing can be utilized to enhance the operation of the device by, for example, compensating for defective pixels, differing pixel signal levels, and other tested pixel attributes.

Additionally, imaging sensors are not identifiable when they are being manufactured. The security/identification values are assigned after the complete system is manufactured, resulting in an additional step in manufacturing that also adds to the cost of manufacture. There is also an administrative burden with regard to keeping track of defective pixel information before an identification number is assigned, as the sensor and the defective pixel information related to the pixel must be physically tracked throughout the manufacturing process. If a sensor is misplaced in the manufacturing sequence, then the integrated circuit imaging array, and all the other integrated circuit imaging array that are mis-sequenced, must be re-tested.

A certain number of defective pixels per sensor is tolerated so that a given amount of sensors are deemed usable and manufacturing costs are recovered. In these sensors, pixels that are found to be defective do not exceed a predetermined number for the entire sensor nor do they exceed a predetermined number within a predetermined area. Although the locations of these pixels are discovered during testing, it is an administrative burden, as described above, to keep track of this information during manufacture. More importantly, ensuring that information about defective pixels are supplied with each sensor after manufacture adds to the cost of sensor production. For example, the company that manufactures the sensor must provide the company that manufactures the camera with defective pixel information. Most often, the defective pixel information is provided a separate media (e.g., a floppy disc, a computer-readable tape, or other computer-readable storage media), which adds to costs. And again, problems arise with matching each sensor with its defective pixel information.

CMOS imagers with on-chip programmable memory for storing pixel and identification information for a CMOS sensor array are known. For example, U.S. Pat. No. 6,396,539 (Heller et al.) discloses an on-chip programmable flash memory, which is complex and bulky. Using a programmable memory requires additional storage circuitry (i.e., the memory) and associated circuitry to read, write, and decipher the information in the memory. It would be desirable to provide an image sensor having on-chip storage system that minimizes the amount of additional circuitry needed to implement the memory. Additionally, it would be desirable to have an on chip storage system that does not require additional circuitry to access and interpret the stored information. A simple and easy way to store pixel array information on-chip for later use would also be desirable.

BRIEF SUMMARY OF THE INVENTION

The present invention provides a CMOS image censor array incorporating information storage system as part of the sensor array. Pixel information, such as identification numbers, pixel defect locations and fuse ID information, is stored within the image array. By using photodiodes as laser fuses, a row or rows of a pixel array can be programmed to store various information. No additional circuitry is required because system uses existing structures to decode the information.

These and other features and advantages of the invention will be more readily understood from the following detailed description of the invention which is provided in connection with the accompanying drawings.

DETAILED DESCRIPTION OF THE PREFERRED EMBODIMENT

In the following detailed description, reference is made to the accompanying drawings, which form a part hereof, and in which is shown by way of illustration specific embodiments in which the invention may be practiced. These embodiments are described in sufficient detail to enable those of ordinary skill in the art to make and use the invention, and it is to be understood that structural, logical or other changes may be made to the specific embodiments disclosed without departing from the spirit and scope of the present invention.

In the present invention, a portion of the CMOS pixel array is programmed to store information. More specifically, photodiodes are used as fuse circuits to store information.

In an M times N CMOS pixel array, it is common to incorporate in the design of the array additional rows and/or columns of pixel to allow for redundancy when defective rows and columns are discovered during testing of the array. In accordance with the present invention, the redundant rows and/or columns are used for the storage of additional pixel array information. Information is programmed into the array in a binary format; each pixel is programmed to represent either a "1" or a "0." Consequently, a series of pixels (in a row) are used to represent a series of binary bits of information. Where a typical row in a pixel array may have 380 to 1024 photodiodes connected to it, a great deal of information can be stored. For example, the coded information may identify defective cell locations or manufacturing lot information.

Figure 5:
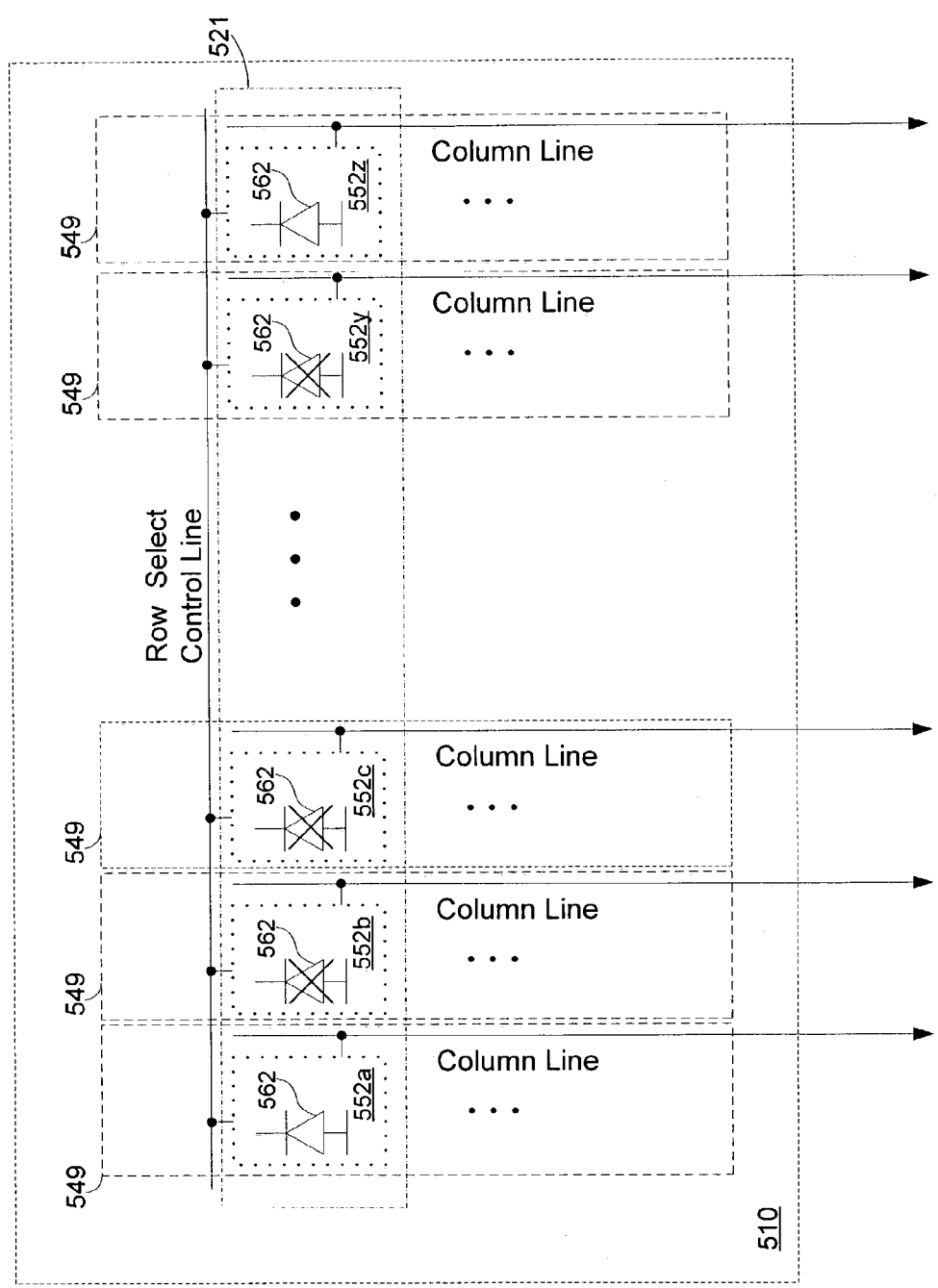
FIG. 5 is a an exemplary embodiment of the CMOS array having programmed pixels.

FIG. 5 shows an exemplary embodiment of the present invention. In FIG. 5, a portion of row 521 of CMOS pixel array 510 is shown having several representative pixels 552*a*, *b*, *c*, *y*, and *z*. Although only five pixels 552 are shown in row 521, the present invention is not so limited. Pixels 552*b*, 552*c*, and 552*y* are shown "altered", i.e., intentionally physically modified. In a preferred embodiment, a pixel is programmed by determining what logic state is required in the bit to represent data. Depending on the desired logic state of the pixel, the pixel may be modified, where a modified pixel represents a first logic state and an unmodified pixel represents a second logic state. In a preferred embodiment, a pixel is modified by applying a laser to a photodiode during manufacturing, in a similar manner as when applying a laser, or a sufficient voltage, to a fuse during manufacturing, which causes the photodiode to be defective. Pixels 552*b*, 552*c*, and 552*y* shown with their respective photodiodes marked with an "X" signifies that pixels 552*b*, 552*c*, and 552*y* have intentionally manufactured defective photodiodes.

During manufacturing, testing, and data storage operations of the pixel array 510, individual pixels 552 are selected for writing by using the existing row and column switching transistors. When a pixel 552 is selected, a laser is applied with sufficient voltage to make the selected photodiode 562 defective. Programming continues in this manner until all of the data is stored appropriately as pixels 552 which are either programmed defective or not defective according to the data information pattern.

Figure 1:
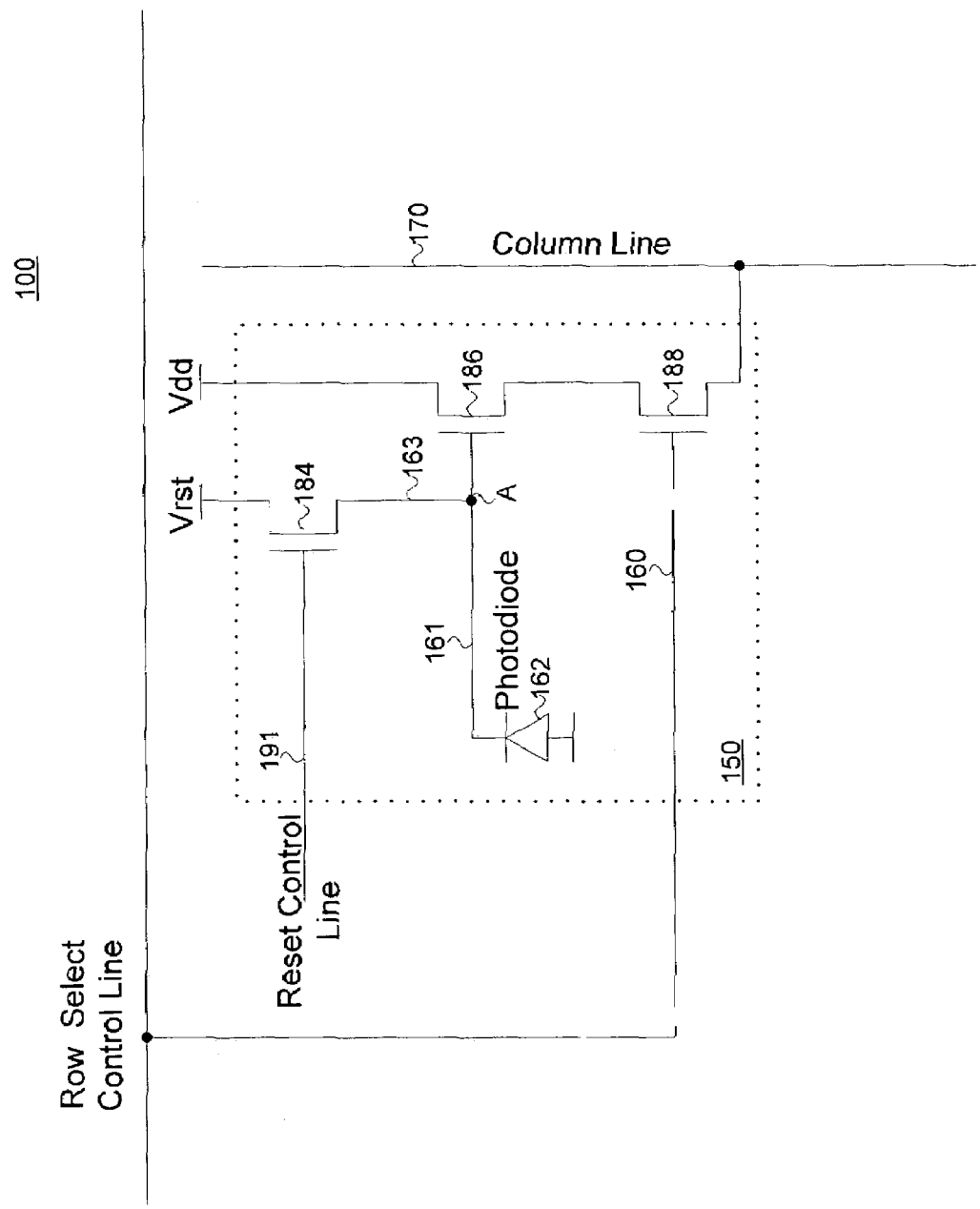
FIG. 1 is a prior art active pixel.
Figure 2:
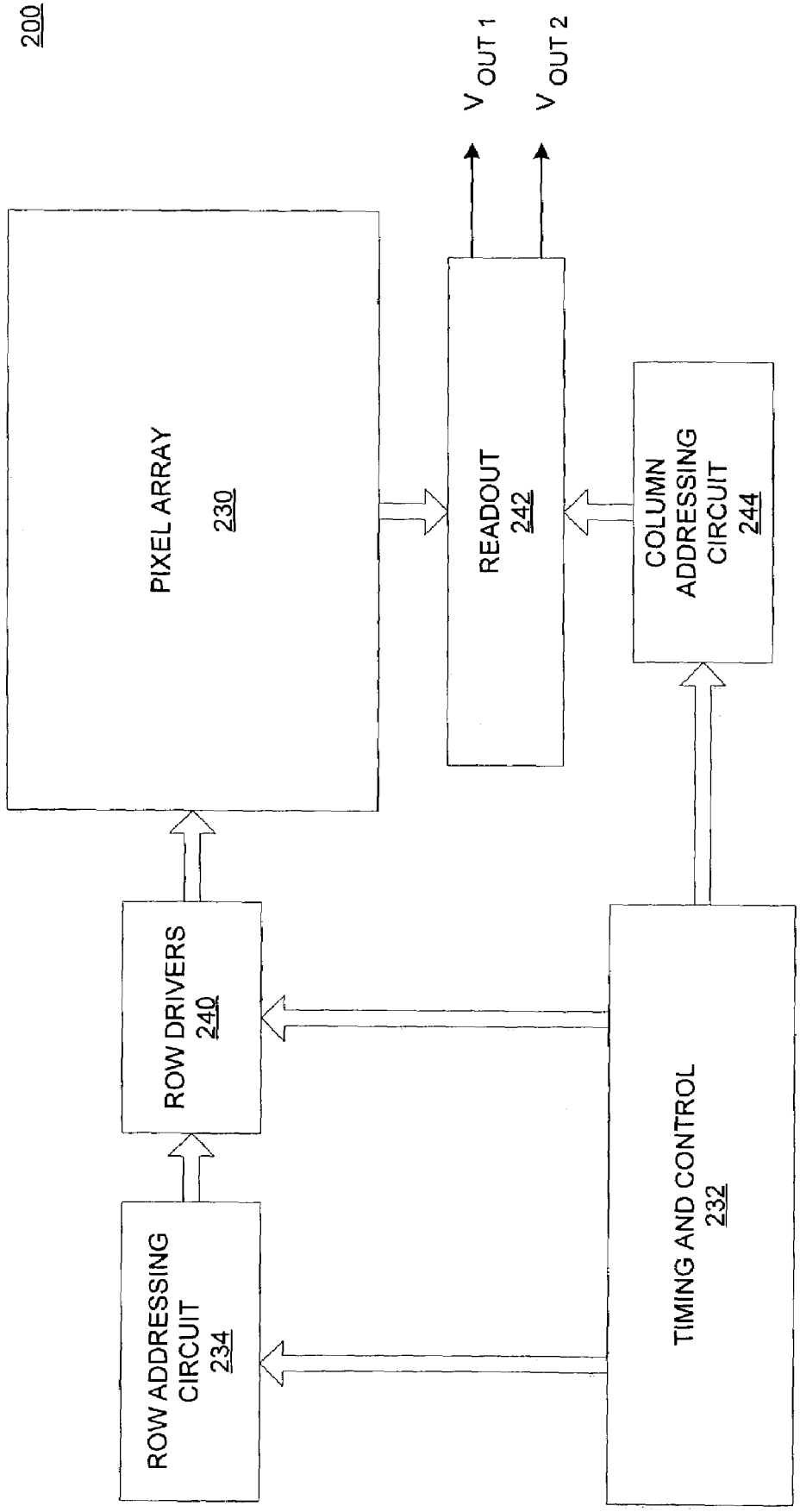
FIG. 2 is a block diagram of a prior art CMOS active sensor chip.
Figure 3:
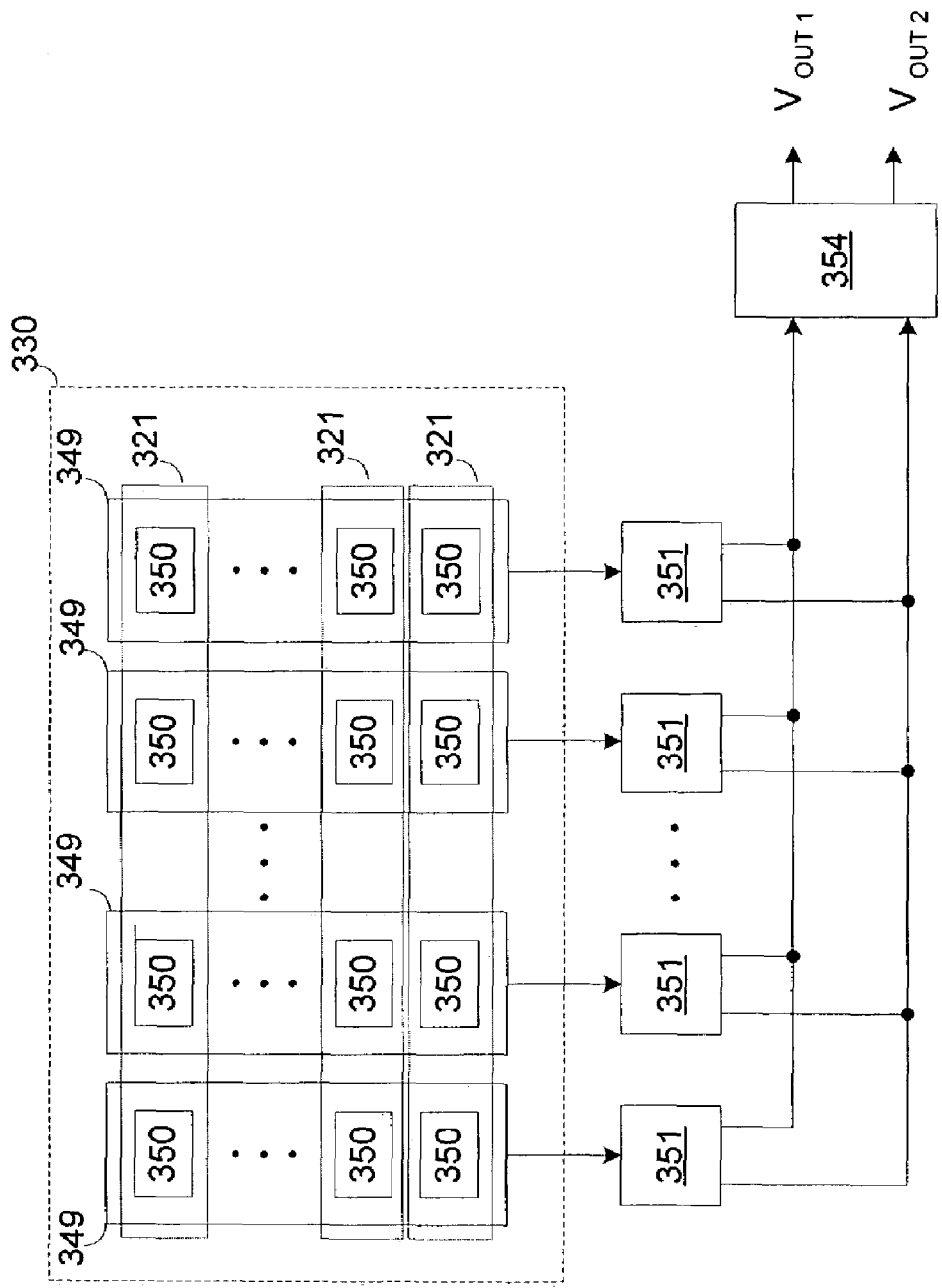
FIG. 3 is a block diagram of a prior art array of active pixels and an associated readout circuit.
Figure 4:
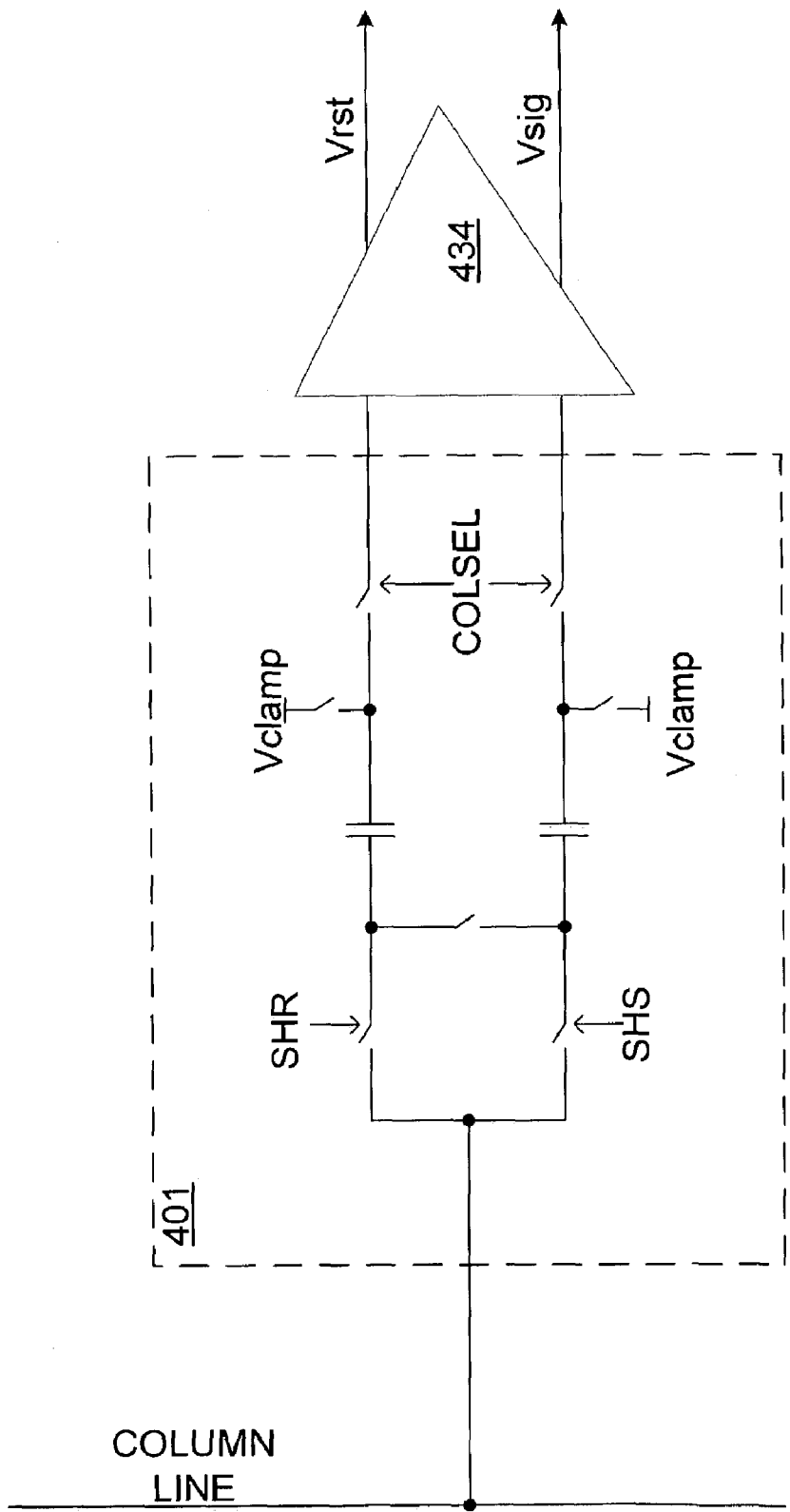
FIG. 4 is a prior art column readout circuit.

Programmed data stored in pixel array 510 is accessed and read out using the existing circuitry structures. Access to the programmed data in the pixel array 510 is the same as is known in the art to read pixels 552, or more specifically, rows of pixels 521, where the data is accessed by the row and column decoders 234, 244 (FIG. 2) and the selected fuse and/or fuses are read to determine the stored data. An intentionally modified photodiode 562 will appear as a defective or incorrect photo diode voltage and is read as one logic state, e.g., "0", while a non-defective photodiode 562 is read as another logic state, e.g., "1." The existing circuit converts the read voltage from an analog data form, e.g., the voltage level read from the pixel 552, to a digital data form, e.g., "0" or "1."

In another aspect of the exemplary embodiment, a metal fuse is used within a pixel in the place of a photosensitive region or photo diode. Programming of the metal fuse and the readout of signals from the pixel is analogous to the method described. In a preferred embodiment, the top row of an imager array is reserved for programming and therefore the pixel cells in the top row comprise metal fuses in place of photosensitive regions. In yet another aspect of the invention, the pixels are reprogrammable. For example, a pixel is programmed to indicated one logic state and can be subsequently reprogrammed to indicate another logic state.

Figure 6:
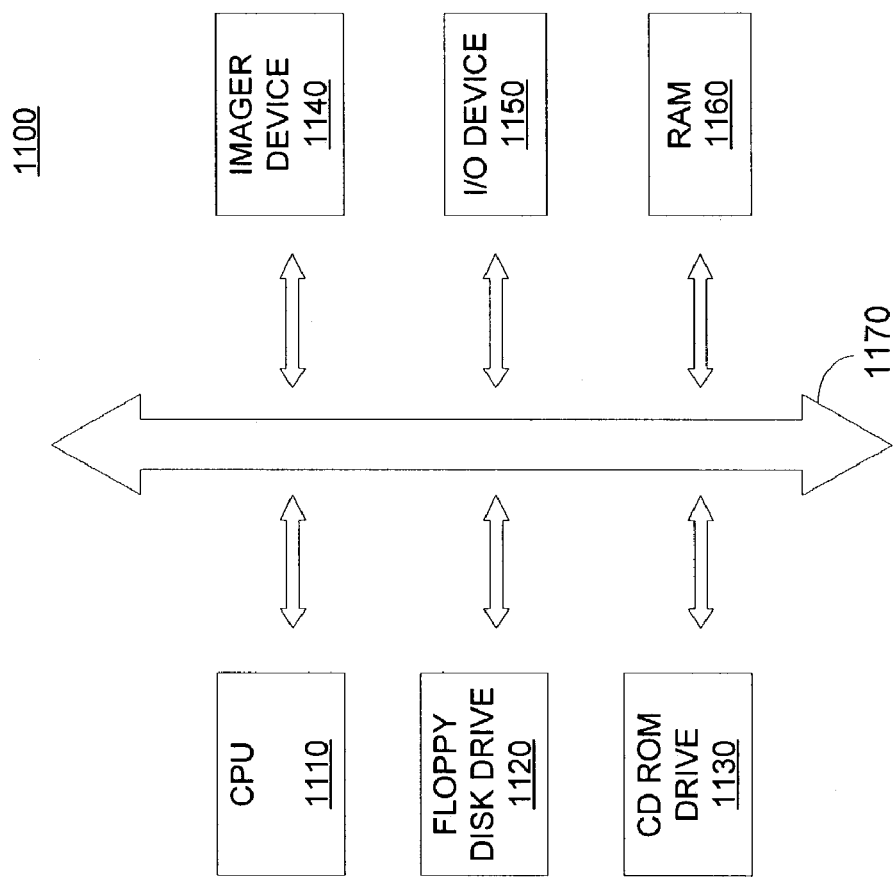
FIG. 6 is a block diagram representation of a processor-based system incorporating a CMOS imaging device in accordance with an exemplary embodiment of the invention.

The method and apparatus aspects of the invention are embodied in an image device 1140 shown in FIG. 6 which provides an image output signal. The image output signal can also be used in a processor system 1100, also illustrated in FIG. 6. A processor based system, such as a computer system, for example, generally comprises a central processing unit (CPU) 1110, for example, a microprocessor, that communicates with one or more input/output (I/O) devices 1150 over one or more buses 1170. The CPU 1110 also exchanges data with random access memory (RAM) 1160 over the one or more buses 1170, typically through a memory controller. The processor system may also include peripheral devices such as a floppy disk drive 1120 and a compact disk (CD) ROM drive 1130 which also communicate with CPU 1110 over one or more buses 1170.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. For example, while the pixels containing a photo diode are disclosed, other types of pixels may be used. Other types of photo collectors can also be used, e.g., photo gates. The embodiments discussed above describe specific numbers of transistors, photodiodes, conductive lines, or pixel type (e.g., 3T, 4T), etc. the present invention is not so limited. Although the preferred embodiment discloses the use of active pixels, passive pixels and dummy pixels may also be used. Further, pixels selected for programming are not limited to being disposed in the redundant columns and rows of image array. Accordingly, the invention is not to be considered as limited by the foregoing description but is only limited by the scope of the claims.

What is claimed as new and desired to be protected by Letters Patent of the United States is:

1. An imaging system with data storage, comprising:
   a chip having a sensor array, said sensor array comprising a plurality of pixels, wherein a first portion of said pixels are used for providing a signal representative of light incident to said sensor array, wherein a second portion of said pixels are used for providing programmed data storage, said second portion of said pixels comprising:
   pixels with modified circuitry to represent data of a first logic state; and
   pixels without modified circuitry to represent data of a second logic state,
   wherein said pixels with modified circuitry include a modified photo sensitive region.

2. The imaging system of claim 1, wherein said pixels with modified circuitry are disabled.

3. The imaging system of claim 1, wherein said pixels with modified circuitry can be unmodified.

4. The imaging system of claim 1, wherein said photo sensitive region of each of said pixels with modified circuitry comprises a photodiode.

5. The imaging system of claim 1, wherein said photo sensitive region of each of said pixels with modified circuitry is modified by a laser.

6. A method of operating an image sensor, comprising storing data in a pixel array of said image sensor by programming selected pixels of said pixel array, wherein said programming further comprises:
   modifying the circuitry of said selected pixels to store data in the selected pixel representing a first logic state; and
   not modifying the circuitry of said selected pixels to store data in the selected pixel representing a second logic state,
   wherein the circuitry of said selected pixel which is modified is the photo sensitive region of said selected pixel.

7. The method of claim 6, further comprising the step of reading said stored data in said pixel array.

8. The method of claim 7, further comprising the step of interpreting said stored data in said pixel array.

9. The method of claim 8, wherein the step of interpreting comprises converting said stored data to a logic state.

10. A method as in claim 6, wherein said data comprises manufacturing information.

11. A method as in claim 6, wherein said data comprises pixel identification information.

12. A method as in claim 6, wherein said data comprises testing information.

13. A method as in claim 6, wherein said data comprises defective pixel information.

14. A method as in claim 6, wherein said step of storing the data comprises an initial step of determining a location within said pixel array to store said data.

15. A method as in claim 14, wherein said step of determining the location to store the data comprises determining a row and column within said pixel array to store said data.

16. A method as in claim 6, wherein said step of modifying the circuitry comprises disabling the circuitry.

17. A method as in claim 6, wherein said photo sensitive region of said selected pixel is a photodiode.

18. A method as in claim 17, wherein said photo sensitive region of said selected pixel is modified by a laser.

19. A semiconductor chip, having a sensor array, said sensor array comprising a plurality of pixels, wherein a first portion of said pixels are used for providing a signal representative of light incident to said sensor array, wherein a second portion of said pixels are used for providing data as different signal states, wherein said second portion of said pixels comprises pixels with defective photosensors to represent data of a first logic state.

20. The semiconductor chip of claim 19, wherein said second portion of said pixels used to provide said data further comprises:
   pixels without defective photosensors to represent data of a second logic state.

21. The semiconductor chip of claim 20, wherein said defective photosensors comprises a photodiode.

22. The semiconductor chip of claim 20, wherein said defective photosensors are laser modified.

23. A processor system, comprising:

a processor; and a pixel sensor array coupled to said processor, said sensor array comprising a plurality of pixels, wherein a first portion of said pixels are used for providing a signal representative of light incident to said sensor array, wherein a second portion of said pixels are used for providing programmed data storage, wherein said second portion of said pixels used to provide programmed data storage comprises:

pixels with defective photosensors represent data of a first logic state, wherein said pixels with modified circuitry include a modified photo sensitive region; and pixels without defective photosensors to represent data of a second logic state.

24. The processor system of claim 23, wherein said pixels with modified circuitry are disabled.

25. The processor system of claim 23, wherein said photo sensitive region of each of said modified pixels comprises a photodiode.

26. The processor system of claim 23, wherein said photo sensitive region of each of said modified pixel are laser modified.

* * * * *